United States Patent
Ghabra

(10) Patent No.: US 7,446,648 B2
(45) Date of Patent: Nov. 4, 2008

(54) PASSIVE ACTIVATION VEHICLE SYSTEM ALERT

(75) Inventor: Riad Ghabra, Dearborn Heights, MI (US)

(73) Assignee: Lear Corporation, Southfield, MI (US)

(*) Notice: Subject to any disclaimer, the term of this patent is extended or adjusted under 35 U.S.C. 154(b) by 360 days.

(21) Appl. No.: 11/425,530

(22) Filed: Jun. 21, 2006

(65) Prior Publication Data

US 2007/0296562 A1    Dec. 27, 2007

(51) Int. Cl.
  B60R 25/10   (2006.01)
  H04Q 5/22    (2006.01)
  B60L 1/00    (2006.01)
(52) U.S. Cl. ............... 340/426.36; 340/426.1; 340/10.1
(58) Field of Classification Search ............. 340/426.36
  See application file for complete search history.

(56) References Cited

U.S. PATENT DOCUMENTS 6,556,135 B2   4/2003   Attring et al.

2004/0145491 A1   7/2004   Nascimento
2004/0217850 A1   11/2004   Perttunen et al.
2005/0200453 A1   9/2005   Turner et al.
2005/0285724 A1   12/2005   Schmidt et al.

FOREIGN PATENT DOCUMENTS

EP   0607873 A1   7/1994
EP   0616101 A1   9/1994

OTHER PUBLICATIONS

Great Britain Search and Examination Report for Application No. GB0711806.0, mailed Oct. 22, 2007, 5 pages.

Primary Examiner—Donnie L Crosland
(74) Attorney, Agent, or Firm—Brooks Kushman P.C.

(57) ABSTRACT

A method of alerting a vehicle passenger or other entity of an inability to re-active a previously activated passive vehicle system. The method being suitable for use with any number of passive activation systems, including but not limited to passive entry and passive starting systems. The method alerting the passenger of the inability to re-active the previously activated passive vehicle system if a fob associated with the passive operation of the same is unavailable.

20 Claims, 1 Drawing Sheet

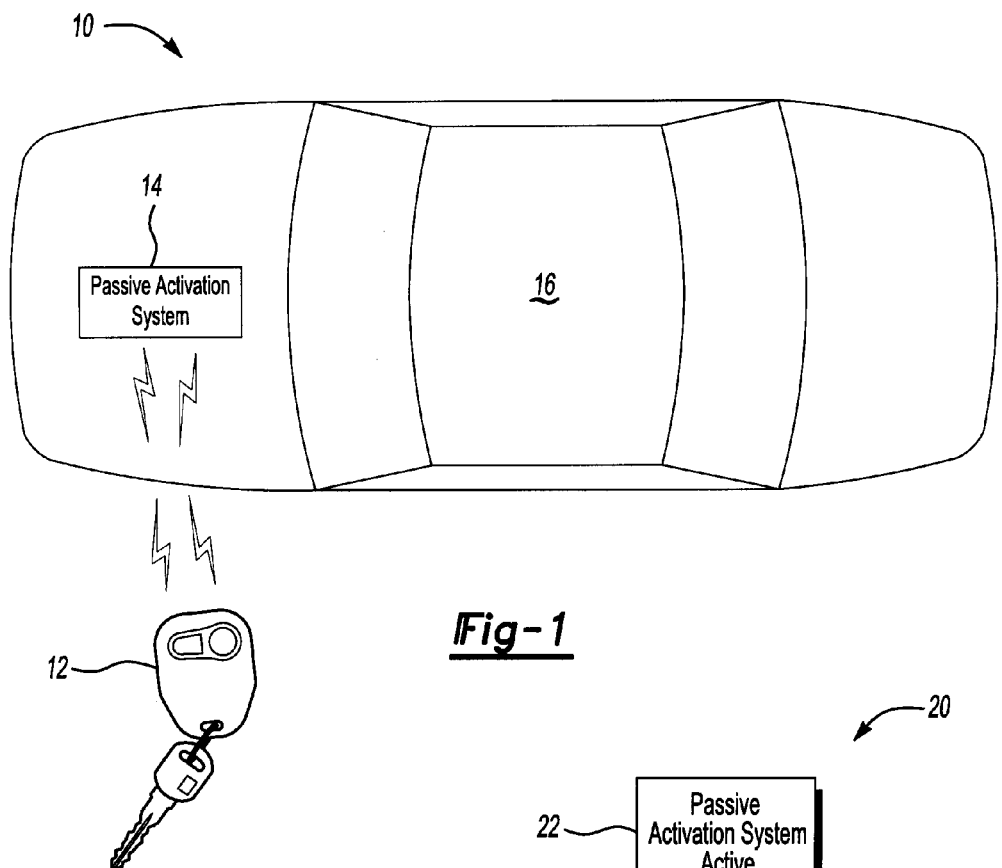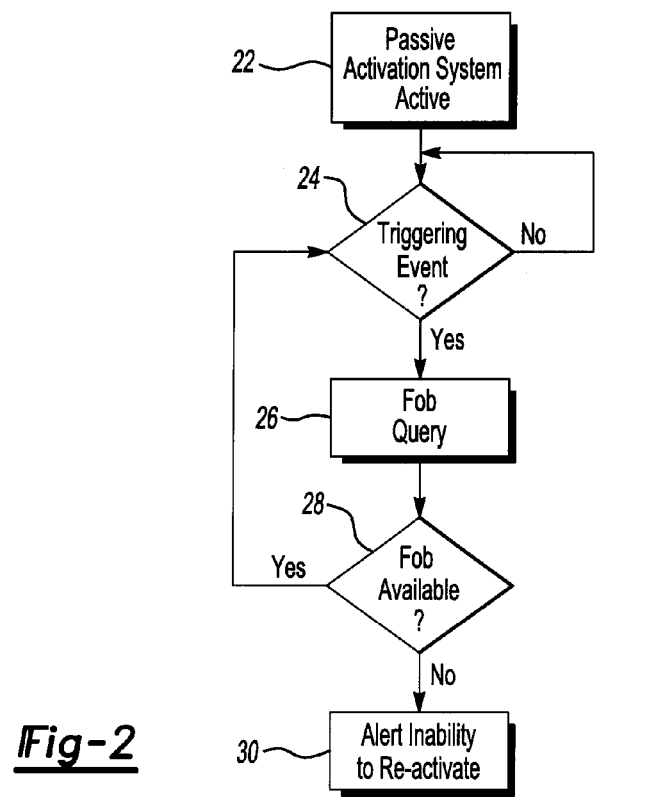

PASSIVE ACTIVATION VEHICLE SYSTEM ALERT

BACKGROUND OF THE INVENTION

1. Field of the Invention

The present invention relates to vehicle based passive activation systems and alerting passengers to an inability to re-active such systems.

2. Background Art

More and more vehicles include passive activation systems, such as but not limited to passive entry and passive starting systems. These systems typically rely on a transmitter, fob, or other passenger carried element to control system activation. With respect to passive starting, for example, a vehicle engine or other driving element may be automatically started by a vehicle controller, a push-button operation, or some other passive or relatively passive action as long as the passenger is carrying the fob and the fob is properly communicating with the vehicle.

Should the passenger forget the fob or should the fob otherwise become unavailable, the passenger may be unable to re-start the vehicle using the passive starting system. The inability to re-start the vehicle can be particularly problematic if the vehicle has already been started and driven to another destination. For example, should the fob be lost out a window, run out of power, become incapacitated, or otherwise become unavailable, and the vehicle is thereafter shut-down, the passenger may be unable to re-start the engine.

SUMMARY OF THE INVENTION

Accordingly, one non-limiting aspect of the present invention relates to alerting the passenger as to the unavailability of the fob to re-active the passive activation system.

Another non-limiting aspect of the present invention relates to limiting fob transmission so as to preserve fob operating life.

Another non-limiting aspect of the present invention relates to maximizing fob operating life by limiting fob transmissions to occurrences of post activation trigger events occurring after activation of the passive vehicle system.

Another non-limiting aspect of the present invention relates to alerting passengers having passive entry system as to an unavailability of a passive entry system fob to facilitate re-entry to the vehicle.

Another non-limiting aspect of the present invention relates to alerting passengers having passive starting system as to an unavailability of a passive starting system fob to facilitate re-starting the vehicle.

Another non-limiting aspect of the present invention relates to determining fob unavailability as a function of whether the fob is within the vehicle.

Another non-limiting aspect of the present invention relates to determining fob unavailability as a function of fob proximity to the vehicle.

Another non-limiting aspect of the present invention relates to determining fob unavailability if the fob is within the vehicle and unable to communicate with the vehicle.

The above features and advantages, along with other features and advantages of the present invention, are readily apparent from the following detailed description of the invention when taken in connection with the accompanying drawings.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a passive activation arrangement in accordance with one non-limiting aspect of the present invention; and FIG. 2 illustrates a flowchart of a method of alerting an inability to re-active a passively activated system in accordance with one non-limiting aspect of the present invention.

DETAILED DESCRIPTION OF THE PREFERRED EMBODIMENT(S)

FIG. 1 illustrates a passive activation arrangement 10 in accordance with one non-limiting aspect of the present invention. The arrangement 10 may include a fob 12 for interacting with a passive activation system 14 of a vehicle 16. As one having ordinary skill in the art will appreciate, vehicles may include any number of passive activation systems 14 that are passively controlled as a function of signals received from the fob 12.

The present invention contemplates the passive activation system 14 being associated with any type of passively activated system 14, including but not limited to a passive entry and/or passive starting system.

The passive entry system 14 may be configured to permit vehicle entry as long as the passenger is carrying the fob 12 and the fob 12 is available for use. The passive entry system 14, for example and without intending to limit the scope and contemplation of the present invention, may be associated with automatically unlocking vehicle doors, disarming an alarm, or providing other passive functionality associated with passively entering or otherwise accessing the vehicle 16.

The passive starting system 14 may operate in a similar manner in that vehicle starting or other functionality associated therewith is permitted or automatically controlled by the vehicle 16 in a passive manner as long as the passenger is carrying the fob 12 and the fob 12 is available for use. The passive starting system 14, for example and without intending to limit the scope and contemplation of the present invention, may be limited to vehicle battery operated elements and/or starting associated with driving operations, such as but not limited to engine, fuel cell, or electric motor starting.

The present invention fully contemplates the passive activation system 14 being associated with any vehicle element, system, component, and/or feature that may be passively accessed, started, or otherwise instigated as a function of fob 12 availability. Accordingly, the present invention is not intended to be limited by the foregoing and contemplates the use of other passive activation vehicle and non-vehicle systems 14.

The fob 12 may be any suitably configured device having capabilities sufficient to facilitate interactions with the passive activation system 14 of the vehicle 16. The fob may include any number of devices, configurations, logical operators, and other elements associated with facilitating operations associated with the passive activation system 14 and necessary to execute the operations associated with the present invention. As such, the present invention is not intended to be limited to any particular configuration for the fob 12.

As shown, the fob 12 may wirelessly communicate with the vehicle 16 and/or passive activation system 14. The wireless communications may be through radio frequency (RF) transmissions or other forms of wireless communications. The vehicle 16 and/or passive activation system 14 may include any number of features and configurations to facilitate communications with the fob 12, including features and capabilities necessary to executed the operations associated with the present invention.

FIG. 2 illustrates a flowchart 20 of a method of alerting a vehicle occupant of an inability to re-active a passive activation system in accordance with one non-limiting aspect of the present invention. The method of the present invention may be executed by a vehicle system controller, a passive activation system, a fob, a combination thereof, and/or through other elements according to logic, software, and other instructions embedded or otherwise associated with the foregoing or features associated therewith.

Block 22 relates to passively activating the passive activation system. This activation may correspond with any action required to activate the passive activation system and may be dependent upon the passive activation being activated.

If the passive activation system corresponds with a passive starting system, the passive starting system may be deemed to be active if the vehicle is passively started as function of interactions with the fob and/or if the vehicle is otherwise started and the fob is present thereafter, such as but not limited to starting the vehicle through an override or manual operation.

If the passive activation system corresponds with a passive entry system, the passive entry system may be deemed to be active if the vehicle is passively entered as function of interactions with the fob and/or if the vehicle is otherwise entered and the fob is present thereafter, such as but not limited to entering the vehicle through an override or manual operation.

Block 24 relates to determining occurrence of a post activation triggering event. The post activation triggering event may be associated with any determinable event occurring after activation of the passive activation system. The triggering events may vary according to the system being activated, i.e., depending on whether the activated system is an entry system, starting system, other system, or combination of systems, and comprise or require occurrence of any number of determinable vehicle operating parameters, events, measurement, and the like.

Optionally, the triggering event may be associated with a vehicle transmission being shifted into drive; the vehicle transmission being shifted into park; depression of a vehicle gas pedal; a vehicle speed greater than zero; incremental changes in vehicle speed, or some combination of other vehicle operating parameters, including but not limited to a combination comprising a vehicle break pedal being depressed, a vehicle transmission shift being in park, and a vehicle powertrain being in run.

Block 26 relates to generating a fob query. The fob query may be communicated from the fob and/or communicated thereto by the vehicle and/or passive activation system in response to occurrence or one or the trigger events and/or in response to some other event. For example, if the query is transmitted from the fob, the fob may be unaware of the vehicle based trigger event and instead be configured to transmit the fob query according to some other logic, which may optionally include features to limit transmissions to some form of less than continuous transmission so that fob operating life (battery) may be maximized.

If the query is transmitted form the vehicle, the query frequency may be similarly limited so as to conserve fob operating life, such as but not limited to requiring occurrence of one or more of the triggering events enumerated above. The fob may be configured to respond to the query with a response signal or some of the form of communication.

Block 28 relates to determining availability of the fob as a function of the fob query. The fob availability may be determined as a function of the fob's response to the fob query, if the fob query is communicated from the vehicle, and/or as a function of the fob query itself, if the fob query is communicated from the fob.

The fob availability may generally relate to an ability of the fob to re-active the previously activated passive activation system activated in Block. As such, the availability of the fob may be determined to any number of parameters associated with the passive activation system, including but not limited to whether the fob is within the vehicle, a proximity of the fob to the vehicle, an ability of the fob to generate and/or reply to the fob query, and any number of other states associated with fob activity.

The signals from the fob may be interrogated by the passive activation system to determine whether the fob is available. For example, the strength of the signal may be analyzed to determine whether the proximity of the fob to the vehicle is sufficient to indicate availability of the fob, the lack of response by the fob may be determined to indicate an unavailability of the fob, a weak response or data in the response indicating limited battery life may be determined to indicated fob unavailability, RF tracking or other vehicle sensing operations may be used to determine presence of the fob within the vehicle, and/or any combination or the same or other operations may be used to determine fob availability.

Block 30 relates to alerting the passenger if the fob is unavailable. The alert may comprise any alert suitable of alerting the passenger that the fob is unavailable and that the previously activated passive activation system may not be available for re-activation due to an unavailability of the fob. This alert may helpful in warning the passenger not to stop the running vehicle (passive starting system), not to arm or lock the vehicle entry system (passive entry system), or not to perform some other function associated de-activating the activated passive activation system.

Advantageously, the alerting associated with the present invention can be helpful in preventing the vehicle passenger from becoming stranded or otherwise operating with limited vehicle capabilities due to unavailability of the fob arising after the associated passive activation system is activated.

The present invention is most prominently described with respect to passive activation systems that provide some form of passive activation based on fob availability. The present invention, however, is not intended to be so limited and fully contemplates it use with non-vehicle systems and/or non-passive entry systems that require some form of availability from a fob or similarly portable or secondary device.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention.

Rather, the words used in the specification are words of description rather than limitation, and it is understood that various changes may be made without departing from the spirit and scope of the invention.

What is claimed is:

1. A method for use with a vehicle having a passively activated vehicle system that requires availability of a fob to facilitate passive re-activation, a method comprising:

after the fob is used to facilitate passive activation of the passively activated vehicle system, determining whether the fob is available to facilitate passive re-activation of the vehicle system; and generating an alert for indicating an inability to re-activate the vehicle system if the fob is unavailable.

2. The method of claim 1 further comprising determining the fob to be unavailable if no response is made by the fob to a fob query.

3. The method of claim 1 further comprising determining the fob to be unavailable as a function of a signal strength of a response signal communicated from the fob to the vehicle in response to a fob query.

4. The method of claim 1 further comprising determining the fob to be unavailable as a function of whether the fob is inside the vehicle.

5. The method of claim 1 further comprising determining the fob to be unavailable if the fob is in the vehicle and unable to communicate the with the vehicle.

6. The method of claim 1 further comprising determining whether the fob is available to facilitate passive re-activation of the vehicle system only after occurrence of a post activation triggering event, the post activation triggering event occurring after activation of the passively activated vehicle system.

7. The method of claim 5 further comprising selecting the triggering event as a function of the passively activated vehicle system such that different triggering events correspond with different vehicle systems.

8. The method of claim 5 further comprising selecting the triggering event to correspond with placing a vehicle transmission shift into drive.

9. The method of claim 5 further comprising selecting the triggering event to correspond with shifting the vehicle transmission shift into park.

10. The method of claim 5 further comprising selecting the triggering event to correspond with depression of a vehicle gas pedal.

11. The method of claim 5 further comprising selecting the triggering event to correspond with a vehicle speed greater than zero.

12. The method of claim 5 further comprising selecting the triggering event to correspond with incremental changes in vehicle speed.

13. The method of claim 5 further comprising selecting the triggering event to correspond with a vehicle break pedal being depressed, a vehicle transmission shift being in park, and a vehicle powertrain being in run.

14. The method of claim 5 further comprising issuing a fob query from the vehicle upon occurrence of the passive activation triggering event, the fob query for use in determining the availability of the fob.

15. A method of alerting an vehicle occupant of an inability to re-enter a vehicle having a passive entry system after the occupant enters the vehicle wherein the passive entry system relies on an availability of a key fob in order to permit passive vehicle entry, the method comprising:

transmitting a key fob query from the vehicle upon occurrence of a triggering event occurring after the occupant enters the vehicle through use of the passive entry system; and generating an alert for indicating the inability to re-enter the vehicle through use of the passive entry system if the key fob query indicates the key fob to be unavailable.

16. The method of claim 15 further comprising determining whether the fob is available as a function of whether the fob is in the vehicle.

17. The method of claim 15 further comprising conserving fob operating life by limiting transmission of the fob query to triggering events associated with at least one of placing a vehicle transmission shift into drive, shifting the vehicle transmission shift into park, depression of a vehicle gas pedal, a vehicle speed greater than zero, incremental changes in vehicle speed, or a combination of events comprising a vehicle break pedal being depressed, a vehicle transmission shift being in park, and a vehicle powertrain being in run.

18. A method of alerting an vehicle occupant of an inability to re-start a vehicle having a passive starting system after the occupant enters the vehicle wherein the passive starting system relies on an availability of a key fob in order to permit passive vehicle start, the method comprising:

transmitting a key fob query from the vehicle upon occurrence of a triggering event occurring after the occupant starts the vehicle through use of the passive starting system; and generating an alert for indicating the inability to re-start the vehicle through use of the passive starting system if the key fob query indicates the key fob to be unavailable.

19. The method of claim 18 further comprising determining whether the fob is available as a function of whether the fob is in the vehicle.

20. The method of claim 18 further comprising conserving fob operating life by limiting transmission of the fob query to triggering events associated with at least one of placing a vehicle transmission shift into drive, shifting the vehicle transmission shift into park, depression of a vehicle gas pedal, a vehicle speed greater than zero, incremental changes in vehicle speed, or a combination of events comprising a vehicle break pedal being depressed, a vehicle transmission shift being in park, and a vehicle powertrain being in run.

* * * * *